United States Patent
Priya et al.

(10) Patent No.: US 12,506,647 B2
(45) Date of Patent: Dec. 23, 2025

(54) SIGNAL RECEIVER AND SIGNAL RECEIVING METHOD FOR OTFS BASED MMWAVE COMMUNICATION SYSTEMS HAVING NON-IDEAL POWER AMPLIFIER ATTRIBUTING NONLINEAR DISTORTIONS IN THE SIGNAL

(71) Applicant: THE INDIAN INSTITUTE OF TECHNOLOGY KHARAGPUR, West Bengal (IN)

(72) Inventors: Preety Priya, West Bengal (IN); Ch Santosh Reddy, West Bengal (IN); Debarati Sen, West Bengal (IN)

(73) Assignee: THE INDIAN INSTITUTE OF TECHNOLOGY KHARAGPUR, West Bengal (IN)

( * ) Notice: Subject to any disclaimer, the term of this patent is extended or adjusted under 35 U.S.C. 154(b) by 322 days.

(21) Appl. No.: 18/152,080

(22) Filed: Jan. 9, 2023

(65) Prior Publication Data
US 2024/0007332 A1   Jan. 4, 2024

(30) Foreign Application Priority Data
May 27, 2022 (IN) .............................. 202231030604

(51) Int. Cl.
*H04L 25/03* (2006.01)
*H04B 7/01* (2006.01)
*H04L 5/00* (2006.01)

(52) U.S. Cl.
CPC ......... *H04L 25/03006* (2013.01); *H04B 7/01* (2013.01); *H04L 5/0023* (2013.01)

(58) Field of Classification Search
CPC ............. H04L 25/03006; H04L 5/0023; H04L 25/03171; H04L 5/0007; H04L 27/00;
(Continued)

(56) References Cited

U.S. PATENT DOCUMENTS 6,064,703 A  *  5/2000  Cusani ............. H04L 25/03171
2006/0029143 A1 * 2/2006  Yoshida ............ H04L 25/03006
(Continued)

*Primary Examiner* — Lana N Le
(74) *Attorney, Agent, or Firm* — MASUVALLEY & PARTNERS; Peter Martinez

(57) ABSTRACT

The present invention discloses a signal receiver and signal receiving method involving nonlinear detection method for mmWave OTFS systems in high mobility scenarios with non-ideal power amplifier, which is applicable in the fifth generation (5G) and beyond networks. The millimeter wave (mmWave) system is envisioned to be a promising candidate of 5G. However, the high frequency and large bandwidth operation in mmWaves result in nonlinear distortions from the power amplifier in the system. The nonlinearly distorted signals from non-ideal power amplifier when propagate through a wideband high mobility channel tremendously degrades the systems performance. Attributed to the non-ideal power amplifier, the nonlinear distortions induce multiplicative distortions and inter symbol interference (ISI) in the OTFS system. It further causes the posterior probability of the transmitted signal non-Gaussian and analytically intractable. The present signal receiver and signal receiving method proposes an amalgamation of maximal ratio combining (MRC) and particle filter in the delay-Doppler domain to retrieve the desired signal from the nonlinearly impaired observations.

11 Claims, 7 Drawing Sheets

Figure 1:
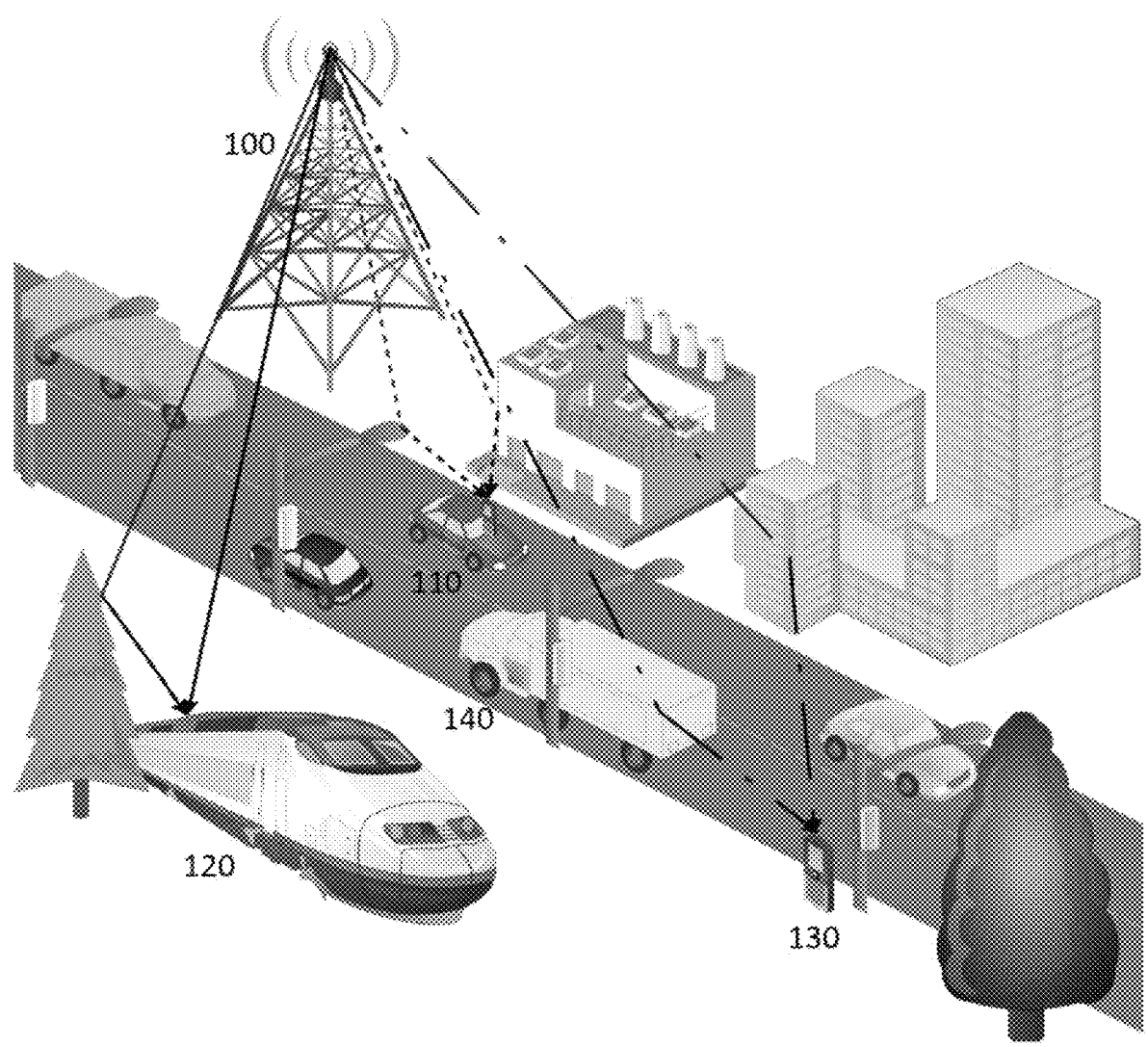

(58) Field of Classification Search
CPC .............. H04L 27/367; H04L 27/2639; H04L 27/2627; H04L 27/2697; H04L 5/00; H04B 7/01; H04B 17/102; H04B 7/0617; H04B 1/0475; H04B 17/345; H04B 17/309; H04B 17/364; H04B 2001/0425; H04B 7/08; H04B 7/0671; H04B 7/22; H04B 7/043; H04B 1/62; H04B 2001/0433; H04B 7/06; H04B 17/17; H04B 17/29; H04B 1/50
See application file for complete search history.

(56) References Cited

U.S. PATENT DOCUMENTS

| | | | |
|---|---|---|---|
| 2011/0156815 A1* | 6/2011 | Cho | H04B 17/102 |
| 2013/0094612 A1* | 4/2013 | Kim | H04B 1/0475 |
| 2015/0124912 A1* | 5/2015 | Eliaz | H04L 1/005 |
| 2018/0205481 A1* | 7/2018 | Shlomo | H04L 27/2639 |
| 2019/0081836 A1* | 3/2019 | Hadani | H04L 5/0023 |
| 2019/0238189 A1* | 8/2019 | Delfeld | H04B 7/01 |
| 2023/0086078 A1* | 3/2023 | Motlagh | H04L 5/0023 |

* cited by examiner

SIGNAL RECEIVER AND SIGNAL RECEIVING METHOD FOR OTFS BASED MMWAVE COMMUNICATION SYSTEMS HAVING NON-IDEAL POWER AMPLIFIER ATTRIBUTING NONLINEAR DISTORTIONS IN THE SIGNAL

CROSS-REFERENCE TO RELATED APPLICATION

This application claims priority to Indian Patent Application No. 202231030604 filed on May 27,2022, which is hereby incorporated herein by reference in its entirety.

FIELD OF THE INVENTION

The present invention relates to high mobility applications in wireless communications in millimeter wave (mmWave) frequency band. More specifically the present invention is directed to provide a nonlinear detection method for mmWave systems in high mobility scenarios with non-ideal power amplifier, which is applicable in the fifth generation (5G) and beyond networks.

BACKGROUND OF THE INVENTION

Millimeter waves (mmWaves) are envisioned to support the emerging intelligent digital society in high mobility communications. Conventional orthogonal-frequency-division-multiplexing is not reliable in such scenarios due to its sensitivity to Doppler spread.

To deal with, orthogonal time-frequency space (OTFS) modulation has emerged as a strong contender. However, its transmission involves two-dimensional convolution between the transmitted symbols and the multipath fading channel in the delay-Doppler domain which complicates equalization. The true potential of mmWave OTFS systems can be utilized with efficient equalization and signal detection schemes. However, the inevitable nonlinear distortions of radio frequency (RF) power amplifier attributed to the high-frequency operation and large bandwidth in mmWaves, escalate the complicacy.

The nonlinear distortions induce inter-symbol interference (ISI) and cause the target distribution to be analytically intractable. Hence, a nonlinear detection scheme is required to be developed to retrieve the transmitted samples from the distorted observations. In literature, several detection techniques for OTFS systems are developed considering linear behavior of power amplifier, e.g.

[1] P. Raviteja, K. T. Phan, Y. Hong and E. Viterbo, "Interference Cancellation and Iterative Detection for Orthogonal Time Frequency Space Modulation," in *IEEE Transactions on Wireless Communications*, vol. 17, no. 10, pp. 6501-6515, October 2018.

[2] T. Thaj and E. Viterbo, "Low Complexity Iterative Rake Decision Feedback Equalizer for Zero-Padded OTFS Systems," in *IEEE Transactions on Vehicular Technology*, vol. 69, no. 12, pp. 15606-15622, December 2020.

[3] Y. Shan and F. Wang, "Low-Complexity and Low-Overhead Receiver for OTFS via Large-Scale Antenna Array," in *IEEE Transactions on Vehicular Technology*, vol. 70, no. 6, pp. 5703-5718, June 2021.

[4] J. Cheng, C. Jia, H. Gao, W. Xu and Z. Bie, "OTFS Based Receiver Scheme with Multi-Antennas in High-Mobility V2X Systems,"2020 *IEEE International Conference on Communications Workshops (ICC Workshops)*, 2020, pp. 1-6.

[5] R. Hadani and S. S. Rakib, "Modulation and equalization in an orthonormal time-frequency shifting communications system", U.S. Pat. No. US10567125B2, published on February, 2020.

[6] W. Xuet.al., "Linear equalization method and apparatus for orthogonal time frequency space system, and electronic device and storage medium", WO PATENT WO2021042621A1, published on March, 2021.

Hence, there has been a need for developing a detection technique considering nonlinear behavior of power amplifier to realize the practical applicability of mmWave systems in high mobility applications employed with OTFS modulation.

OBJECT OF THE INVENTION

It is thus the basic object of the present invention is to develop a detection technique for OTFS based communication systems which would consider nonlinear behavior of power amplifier to realize its practical applicability.

Another object of the present invention is to develop a detection technique for mmWave based communication systems considering nonlinear behavior of power amplifier to realize the practical applicability of the mmWave systems in high mobility applications employed with OTFS modulation.

A still further object of the present invention is to develop nonlinear detection method for mmWave systems in high mobility scenarios with non-ideal power amplifier, which is applicable in the fifth generation (5G) and beyond networks.

Yet another object of the present invention is to develop a receiver with detector for mmWave based communication systems for high mobility scenarios with non-ideal power amplifier, which is applicable in the fifth generation (5G) and beyond networks.

SUMMARY OF THE INVENTION

Thus according to the basic aspect of the present invention there is provided a receiver with nonlinear detector for OTFS based mmWave communication systems involving non-ideal power amplifier, said receiver with nonlinear detector is configured to retrieve signal having nonlinear distortions including multiplicative distortion and inter symbol interference (ISI) resulting in intractable posterior distribution of delay-Doppler samples attributed by said non-ideal power amplifier and comprises antennas for receiving transmitted signal and passing the same to an analog beamforming unit;

said analog beamforming unit to decouple the received signal into multiple parallel paths;

at least one delay-Doppler domain unit for converting received time-domain signal after beamforming for each identified path into delay-Doppler domain with applicable nonlinear distortion;

maximal ratio combining unit with delay and Doppler compensating unit to yield nonlinearly distorted delay-Doppler domain OTFS sample $\hat{X}^{\dagger}(l, k)$;

particle filter unit to approximate intractable distribution through particles and weights, which involves estimation of the ISI from previous estimate $\{\hat{X}(l, k)\}_{k=0}^{N-1}$ after converting it to time domain samples $\hat{s}(n)$, whereby the ISI $\hat{\xi}_{\tilde{s}(l+kM)}(k)$ is obtained from its expression, thus enabling MAP detection to acquire the transmitted delay-Doppler samples estimate free of the ISI effect.

In a preferred embodiment of the present receiver with nonlinear detector, the particle filter unit and the MAP detection are executed iteratively until estimate of the delay-Doppler samples $\{\hat{X}(l, k)\}_{k=0}^{N-1}$ obtained at current iteration becomes equal to the estimates obtained at previous iteration or until the iteration reaches its maximum value.

In a preferred embodiment of the present receiver with nonlinear detector, the maximal ratio combining unit includes FPGA board based computing hardware with accumulator, memory blocks, Mod operation, Multiplier, and COordinate Rotation DIgital Computer (CORDIC) for executing computation of $$\hat{Y}_{\theta_i}(l, k) = \begin{cases} e^{-j\frac{2\pi}{MN}k_{\theta_i}\left([l+l_{\theta_i}]_M - l_{\theta_i}\right)} Y_{\theta_i}\left([l+l_{\theta_i}]_M, [k+k_{\theta_i}]_N\right) & l \in [l_{\theta_i}, M-1] \\ \frac{N}{N-1} e^{-j\frac{2\pi}{MN}k_{\theta_i}l} e^{j\frac{2\pi}{N}k} Y_{\theta_i}\left([l+l_{\theta_i}]_M, [k+k_{\theta_i}]_N\right) & l \in [0, l_{\theta_i}) \end{cases}$$

and $$\hat{X}^\dagger(l, k) = \frac{\sum_{i=1}^{B} \alpha_{\theta_i}^* \hat{Y}_{\theta_i}(l, k)}{\sum_{i=1}^{B} |\alpha_{\theta_i}|^2}.$$

In a preferred embodiment of the present receiver with nonlinear detector, the particle filter includes IFFT, vectorization operator, hard detector, importance density for drawing particles, and importance weight computation implemented in hardware using any FPGA board using Xilinx with some basic blocks like counters, memory blocks, IFFT, arithmetic logic units, comparators, and CORDIAC.

In a preferred embodiment of the present receiver with nonlinear detector, the analog beamforming unit decouple the received signals into multiple parallel paths and identify the appropriate paths by thresholding the received signals, wherein the beamforming angle corresponding to which a path exists i.e., received signal power after beamforming, is greater than a threshold value.

In a preferred embodiment of the present receiver with nonlinear detector, the nonlinearly distorted delay-Doppler domain OITS sample $X^\dagger(l, k)$ is expressed as $$X^\dagger(l, k) = \left[X(l, k) \frac{1}{N} \sum_{\check{k}=0}^{N-1} \boxed{?}_{s(l+\check{k}M)} + \zeta_{s(l+\check{k}M)}(k)\right]$$

where, $X(l, k)$ is the OTS sample $l^{th}$ delay index and $k^{th}$ Doppler index, and $$\frac{1}{N} \sum_{\check{k}=0}^{N-1} \boxed{?}_{s(l+\check{k}M)}$$

represents multiplicative distortion, where $$\boxed{?}_{s(l+\check{k}M)} = ge^{j\left(\psi\left(|s(l+\check{k}M)|\right)\right)} / \left[1 + \left(g|s(l+\check{k}M)|/V_{sat}\right)^{2\sigma_p}\right]^{\frac{1}{2\sigma_p}} \text{ and}$$

$$\xi_{s(l+\check{k}M)}(k) = \frac{1}{N} \sum_{\check{k}=0}^{N-1} \left(\boxed{?}_{s(l+\check{k}M)} \sum_{\tilde{p}=0, \tilde{p} \neq k}^{N-1} X(l, \tilde{p}) e^{j2\pi(\tilde{p}-k)\check{k}/N}\right)$$

denotes the ISI from the nonlinear power amplifier;

whereby, the delay-Doppler domain nonlinearly distorted OTFS samples $X^\dagger(l, k)$ in an auxiliary state represents a linear relationship between observations $Y_{\theta_i}(l, k)$ and nonlinearly distorted samples $X^\dagger(l, k)$ thus enabling application of the maximal ratio combining unit on compensating the delay shift, Doppler shift, and phase shift to yield the nonlinearly distorted delay-Doppler domain OTFS sample, wherein the compensation phase can be performed by computing $$\hat{Y}_{\theta_i}(l, k) = \begin{cases} e^{-j\frac{2\pi}{MN}k_{\theta_i}\left([l+l_{\theta_i}]_M - l_{\theta_i}\right)} Y_{\theta_i}\left([l+l_{\theta_i}]_M, [k+k_{\theta_i}]_N\right) & l \in [l_{\theta_i}, M-1] \\ \frac{N}{N-1} e^{-j\frac{2\pi}{MN}k_{\theta_i}l} e^{j\frac{2\pi}{N}k} Y_{\theta_i}\left([l+l_{\theta_i}]_M, [k+k_{\theta_i}]_N\right) & l \in [0, l_{\theta_i}) \end{cases};$$

wherein, the application of MRC to estimate the delay-Doppler domain nonlinearly distorted OTFS samples is performed by computing $$\hat{X}^\dagger(l, k) = \frac{\sum_{i=1}^{B} \alpha_{\theta_i}^* \hat{Y}_{\theta_i}(l, k)}{\sum_{i=1}^{B} |\alpha_{\theta_i}|^2}.$$

In a preferred embodiment of the present receiver with nonlinear detector, the estimate of multiplicative distortion and the ISI are obtained by utilizing initial tentative estimates of the delay-Doppler samples $\{\hat{X}(l, k)\}_{k=0}^{N-1}$ that are obtained by passing the estimated nonlinearly distorted delay-Doppler samples i.e., output of the MRC through hard detection;

whereby, hard detection maps the output of MRC on to the nearest modulation symbols.

$p(X(l, k)|\hat{X}^\dagger(l, 0:k)) \cong \sum_{q=1}^{Q} w^q(l, k) \delta(X(l, k) - X^q(l, k))$ In a preferred embodiment of the present receiver with nonlinear detector, the particle filter approximates the intractable posterior distribution of transmitted delay-Doppler samples in terms of particles and weights as $p(X(l, k)|\hat{X}^\dagger(l, 0:k)) \cong \sum_{q=1}^{Q} w^q(l, k) \delta(X(l, k) - X^q(l, k))$;

whereby the particles are drawn from optimal importance distribution that is obtained by approximating the multiplicative distortion $$\frac{1}{N} \sum_{\check{k}=0}^{N-1} \boxed{?}_{s(l+\check{k}M)} \text{ as } \tilde{\gamma}$$

and assuming $\tilde{\gamma}$ and $\xi_{s(l+\check{k}M)}(k)$ as deterministic and known, thus enabling the optimal importance distribution $\pi(X(l, k)|X^q(l, 0:k-1), \hat{X}^\dagger(l, k), \xi_{s(l+\check{k}M)}(k), \tilde{\gamma}) = p(X(l, k)|X^q(l, 0:k-1), \hat{X}^\dagger(l, k), \xi_{s(l+\check{k}M)}(k), \tilde{\gamma})$ follows the Gaussian distribution with its mean and variance given as $$\mu_* = \tilde{\gamma}^{-1}\left(\hat{X}^\dagger(l, k) - \xi_{s(l+\check{k}M)}(k)\right), \Sigma_* = \frac{\sigma_v^2}{|\tilde{\gamma}|^2};$$

whereby, weights of the particles depends upon likelihood that follows Gaussian distribution i.e., $p(\hat{X}^\dagger(l, k)|X^q(l, k), \xi_{s(l+\check{k}M)}(k), \tilde{\gamma}) \sim \mathcal{CN}(\mu^q(l, k), \Sigma^q(l, k))$ where mean $\mu^q(l, k)$ and variance $\Sigma^q(l, k)$ are defined as $\mu^q(l, k) = \hat{\tilde{\gamma}} X^q(l, k) + \hat{\xi}_{s(l+\check{k}M)}(k), \Sigma^q(l, k) = \sigma_v^2$ and the weight are calculated as $$w^q(l, k) \propto \frac{1}{\pi \det\{\sum^q(l, k)\}}$$

$$\exp -\left[\left(\hat{X}^\dagger(l, k) - \mu^q(l, k)\right)^H \left(\sum^q(l, k)\right)^{-1} \left(\hat{X}^\dagger(l, k) - \mu^q(l, k)\right)\right].$$

In a preferred embodiment of the present receiver with nonlinear detector, the data detection is executed using the MAP decision rule on the approximated posterior distribution of the transmitted delay-Doppler sample by $$\hat{X}(l, k) = \arg\max_{X^q(l,k)} \sum_{q=1}^{Q} w^q(l, k) \delta(X(l, k) - X^q(l, k))$$

whereby, the MAP estimation chooses the particle with maximum weight followed by the application of hard detection on the chosen particle to map it on to the nearest modulation symbols in order to obtain the estimate of the required transmitted delay-Doppler samples.

In a preferred embodiment of the present receiver with nonlinear detector, the particle filter and MAP detection is executed in iteration with the most updated $\{\hat{X}(l, k)\}_{k=0}^{N-1}$ to calculate ISI $\{\hat{\xi}_{s(l+\tilde{k}M)}(k)\}_{k=0}^{N-1}$ and multiplicative distortion $\hat{\tilde{\gamma}}$ is determined heuristically;

whereby, with each iteration, the number of errors in $\{\hat{X}(l, k)\}_{k=0}^{N-1}$ becomes relatively small which subsequently increases the estimation accuracy of $\{\hat{\xi}_{s(l+\tilde{k}M)}(k)\}_{k=0}^{N-1}$, thus enhancing the accuracy of particle filter, thereby, enabling detection of the signal free of the ISI effect and distortions; whereby, iteration stops when $\{\hat{X}(l, k)\}_{k=0}^{N-1}$ obtained at the current iteration no longer differs from $\{\hat{X}(l, k)\}_{k=0}^{N-1}$ obtained at the previous iteration or when the iteration reached its maximum number ($N_{iter}$).

According to another aspect in the present invention there is provided a method for nonlinear detection for OTFS based mmWave communication system with non-ideal power amplifier to retrieve signal having nonlinear distortions including multiplicative distortion and inter symbol interference (ISI) resulting in intractable posterior distribution of delay-Doppler samples attributed by said non-ideal power amplifier involving the above receiver with detector comprising receiving transmitted signal by the antennas and passing the same to the analog beamforming unit;

decoupling the received signal into multiple parallel paths by the analog beamforming unit;

converting received time-domain signal after beamforming for each identified path into delay-Doppler domain with applicable nonlinear distortion by the delay-Doppler domain unit;

yielding nonlinearly distorted delay-Doppler domain OTFS sample $\hat{X}\dagger(l, k)$ involving the maximal ratio combining unit;

estimating the multiplicative distortions $\hat{\tilde{\gamma}}$ and ISI $\hat{\xi}_{s(l+\tilde{k}M)}(k)$ from their expressions by obtaining tentative decisions $\{\hat{X}(l, k)\}_{k=0}^{N-1}$ from the estimated nonlinearly distorted samples $\{\hat{X}\dagger(l, k)\}_{k=0}^{N-1}$ through hard detection and converting tentative decisions to time domain samples $\hat{s}(n)$;

utilizing estimated multiplicative distortions $\hat{\tilde{\gamma}}$ and ISI $\hat{\xi}_{s(l+\tilde{k}M)}(k)$ to obtain the weights and particles from its expression and approximating continuous intractable distribution of transmitted delay-Doppler samples in discrete form utilizing particles and weights by particle filter unit thus enabling the MAP detection and signal free of the ISI and distortions effect;

executing the particle filter unit with MAP detection in iteration wherein the iteration stops when the estimate of the delay-Doppler samples $\{\hat{X}(l, k)\}_{k=0}^{N-1}$ obtained at the current iteration becomes equal to the estimates obtained at the previous iteration or until the iteration reaches its maximum value.

BRIEF DESCRIPTION OF THE ACCOMPANYING DRAWINGS

Figure 2:
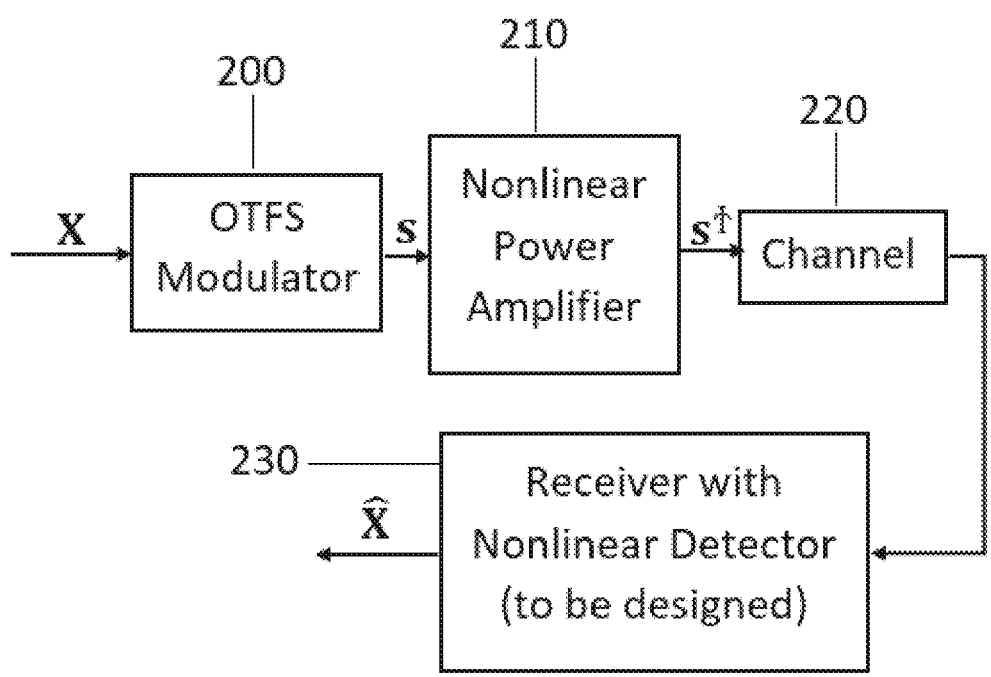
Figure 3:
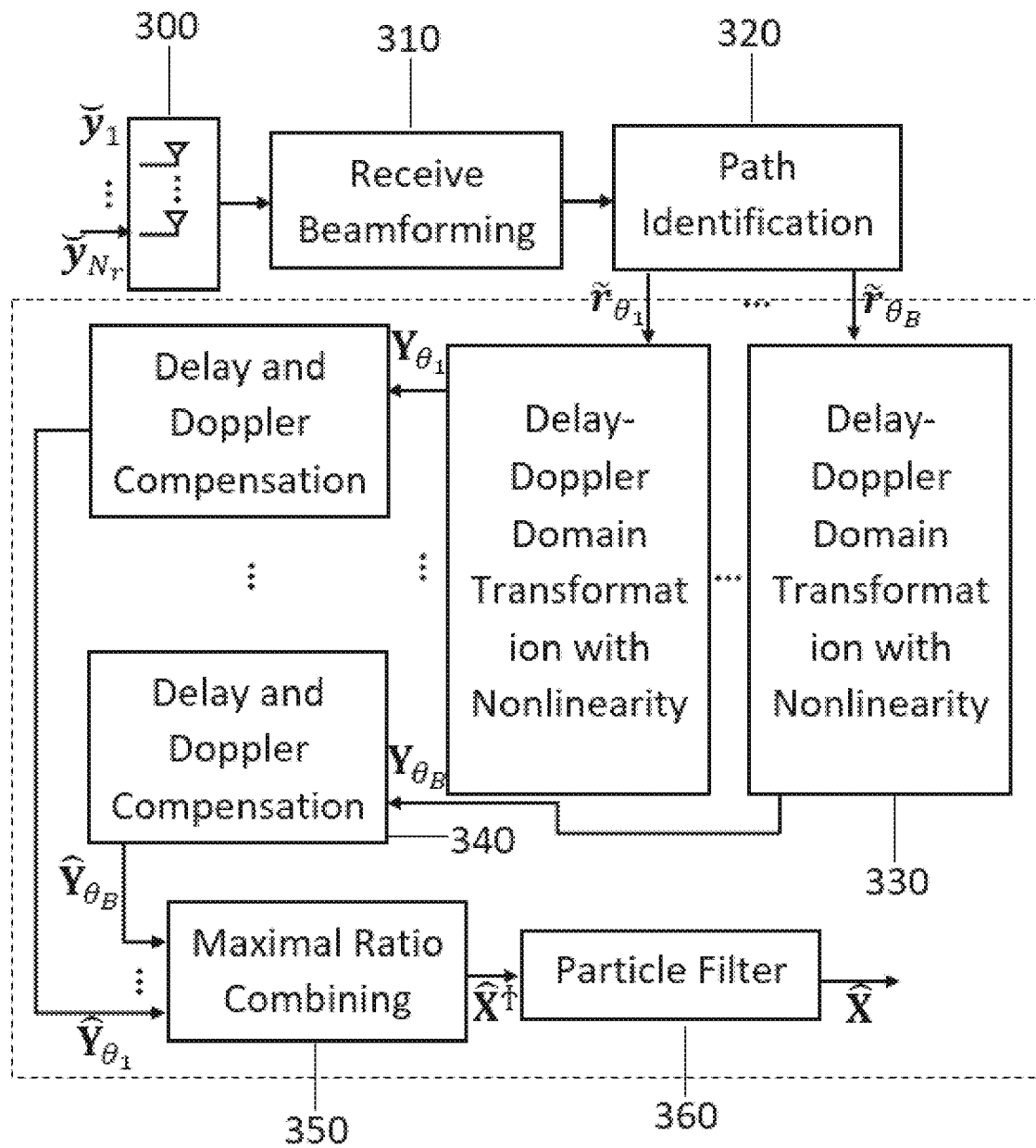
Figure 4A:
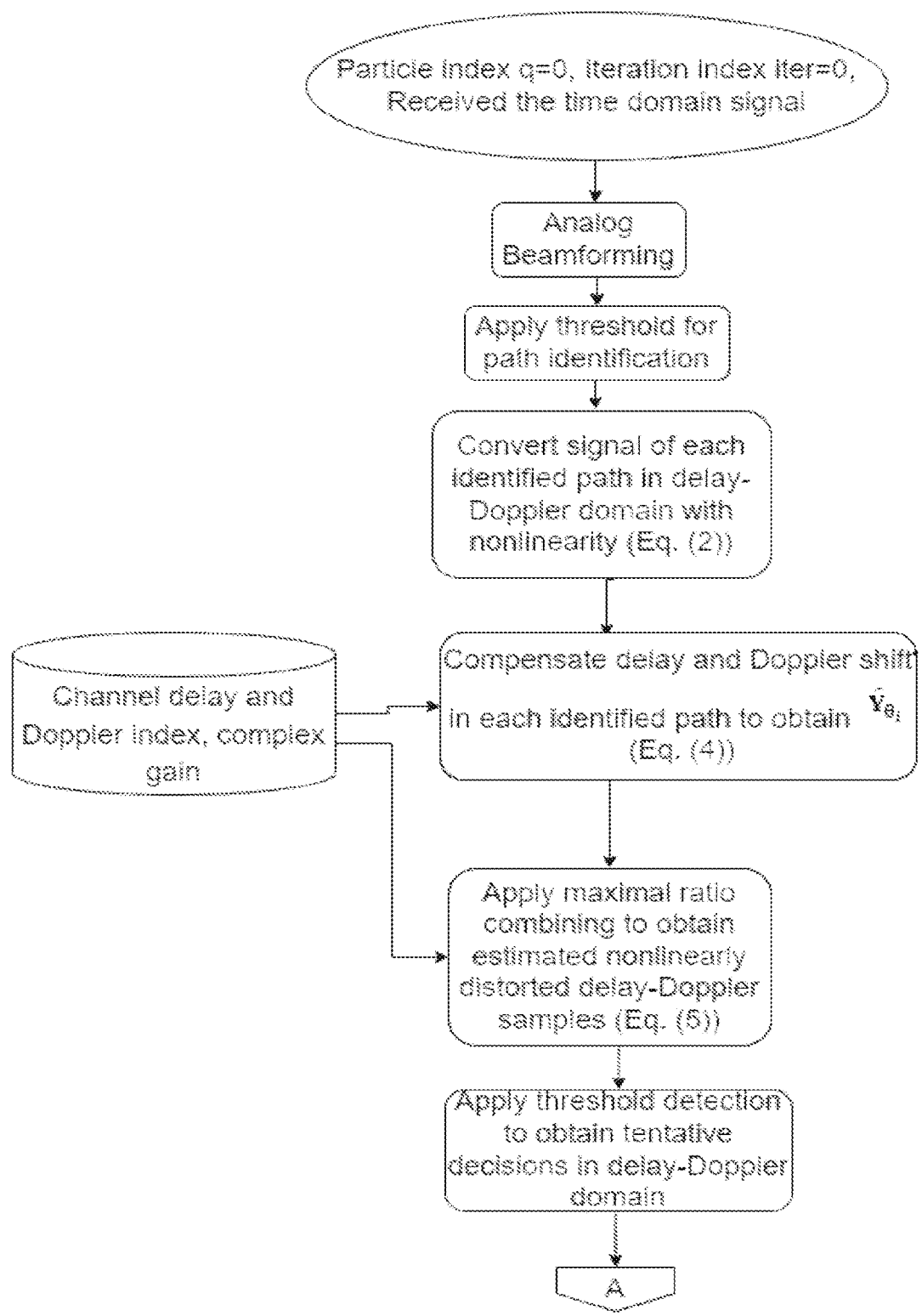
Figure 4B:
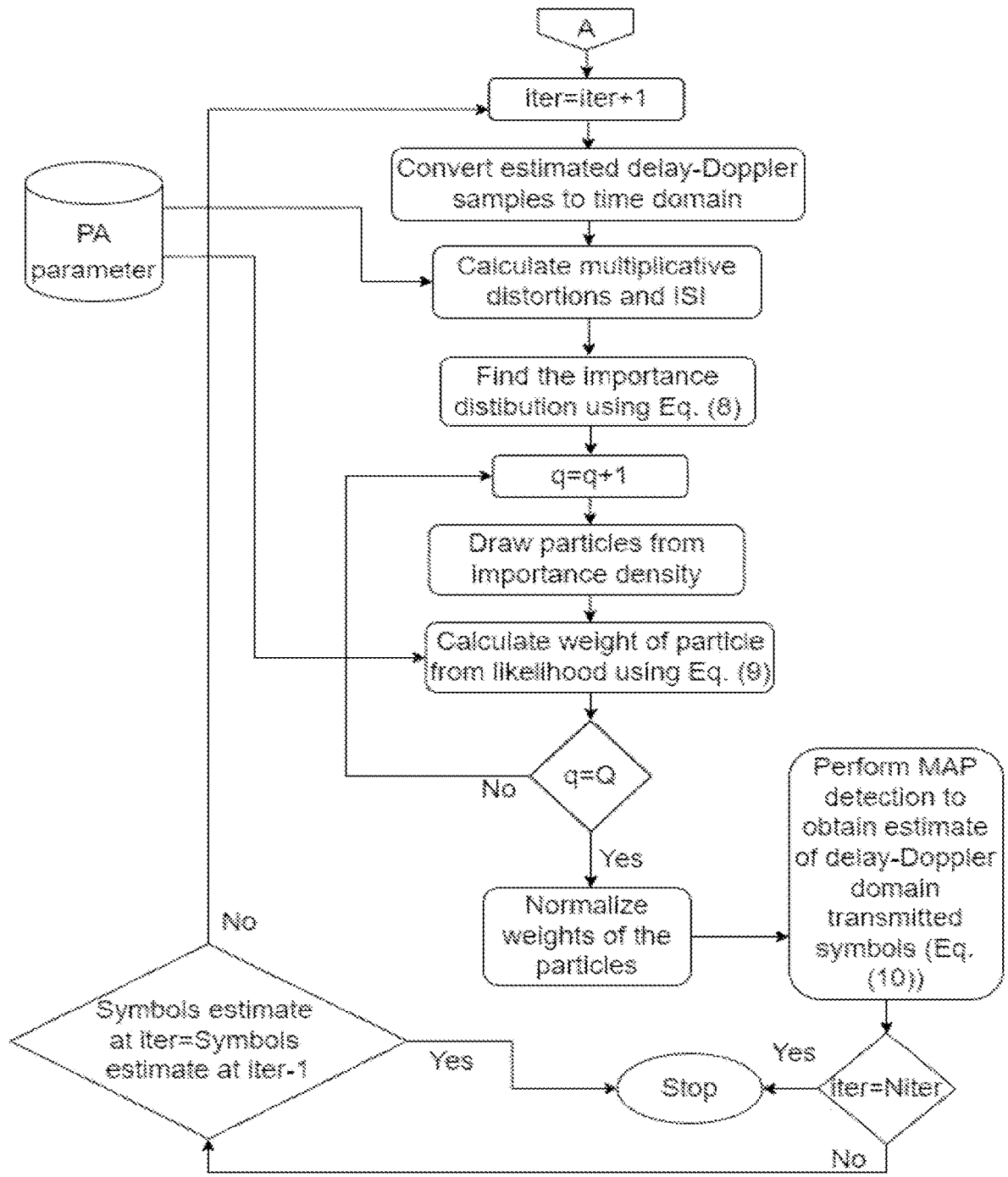
Figure 5:
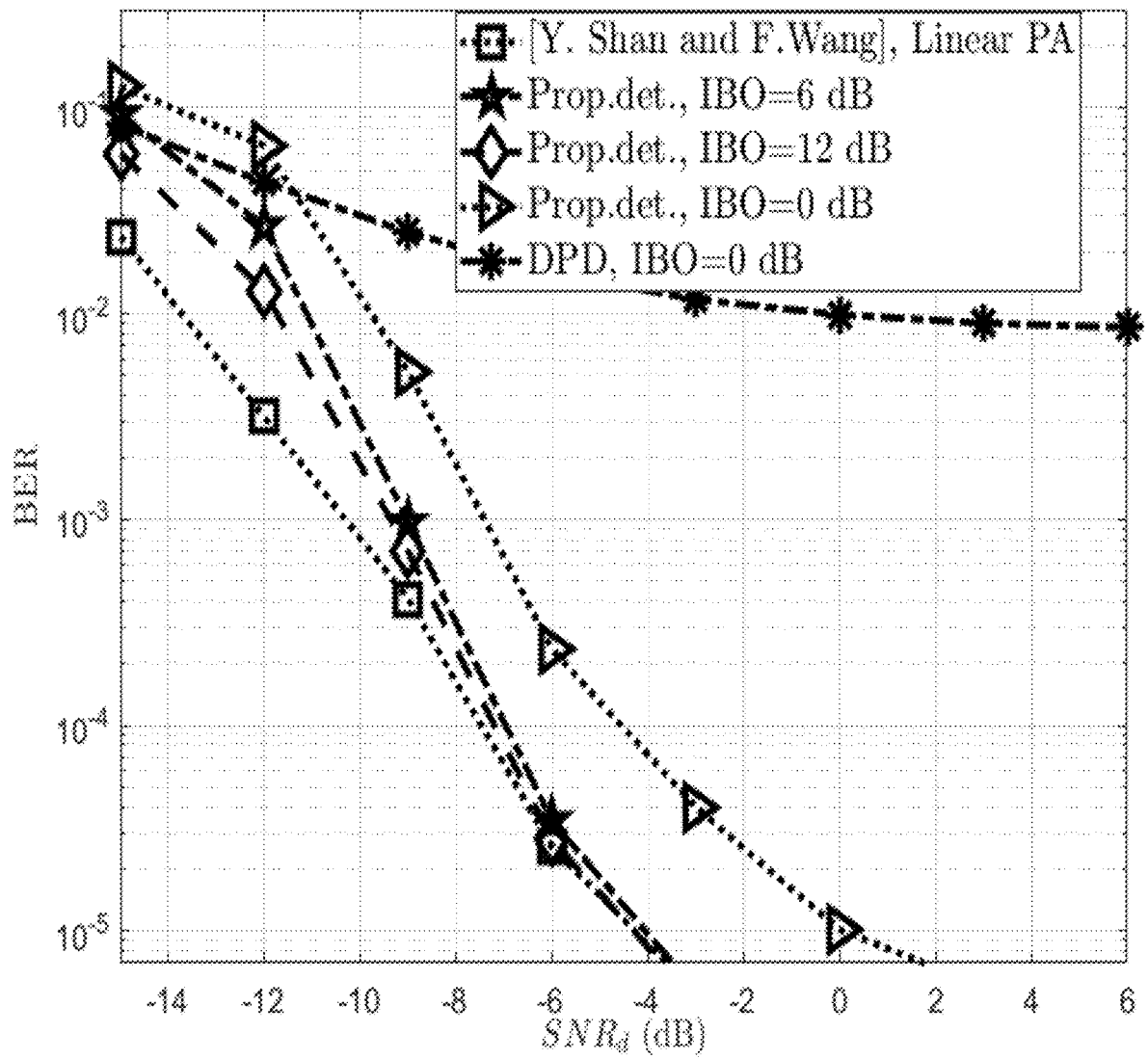
Figure 6:
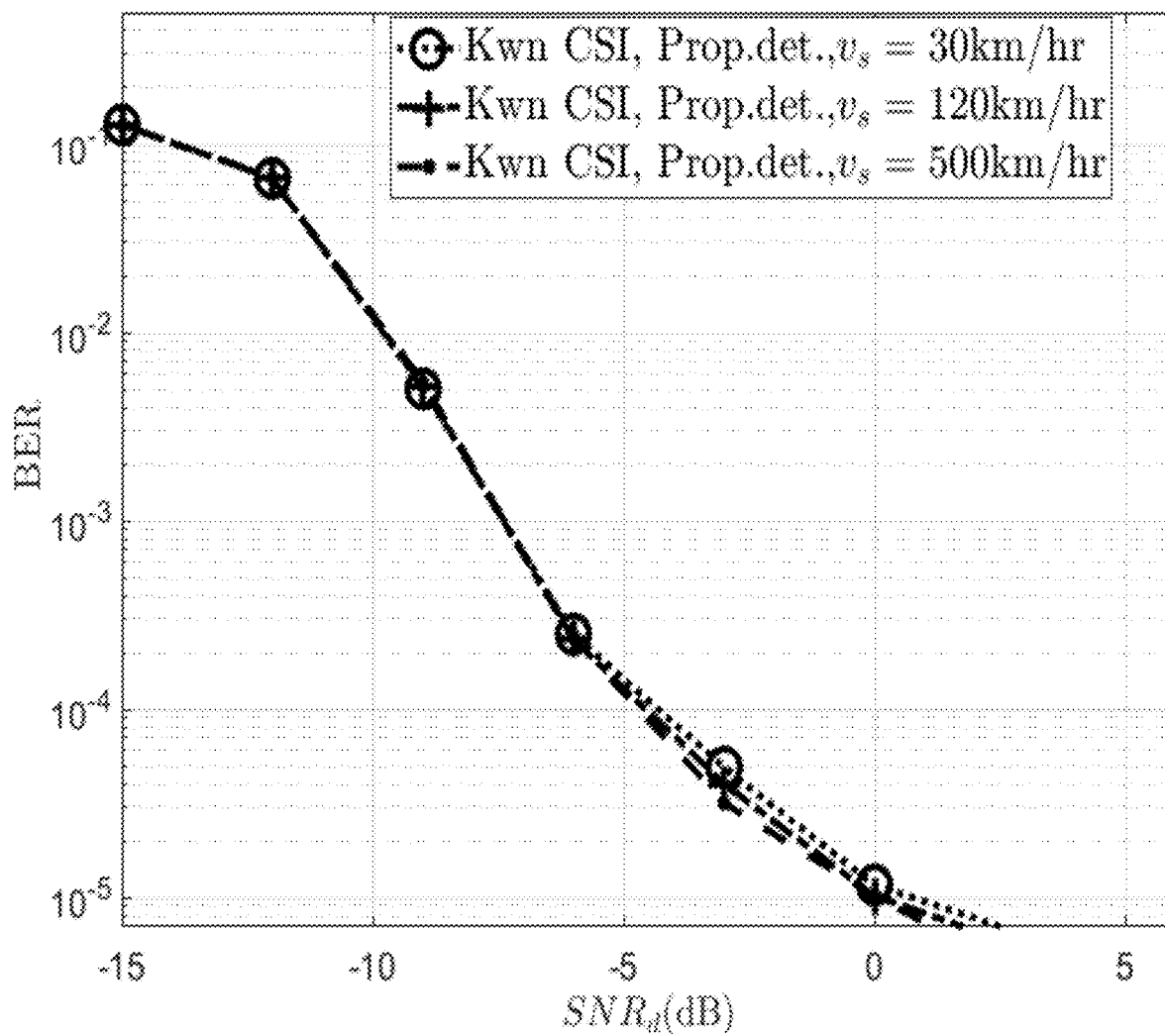

FIG. 1: Communication scenario.
FIG. 2: OTFS transmitter-receiver with nonlinearity.
FIG. 3: Receiver with proposed nonlinear detector.
FIG. 4A: A partial view of flow diagram of proposed nonlinear detector.
FIG. 4B: Another and final partial view of flow diagram of proposed nonlinear detector.
FIG. 5: BER vs. $SNR_d$ of the proposed detector for different IBOs, $N_r=128$.
FIG. 6: BER vs. $SNR_d$ of the proposed detector for different speeds at 0 dBIBO, $N_r=128$.

DETAILED DESCRIPTION OF THE INVENTION WITH REFERENCE TO THE ACCOMPANYING DRAWINGS

As stated hereinbefore, the present invention discloses a nonlinear detection method for mmWave systems in high mobility scenarios with non-ideal power amplifier, which is applicable in the fifth generation (5G) and beyond networks. The high mobility applications like intra and inter-vehicular communications in high-speed vehicles, high-speed trains, autonomous driving vehicles, etc., have become evident in wireless communications for the 5G technology. This high mobility induces Doppler effect that causes time selective fading in the wireless channel. Further, the multiple scatterers give rise to the frequency selectivity of the channel. Orthogonal frequency division multiplexing (OFDM) modulation handles the frequency selectivity issues effectively but is sensitive to the Doppler effects. Recently proposed, orthogonal time-frequency space (OTFS) modulation deals with the high mobility issues and is a promising upcoming modulation design.

Millimeter wave system is envisioned to be a promising candidate of 5G. However, the high frequency and large bandwidth operation in mmWaves result in nonlinear distortions from the power amplifier in the system. The non-linearly distorted signals from non-ideal power amplifier when propagate through a wideband high mobility channel tremendously degrades the systems performance. Hence, to realize the benefits of fast communication, high reliability, and improved quality of services (QoS) at mmWave in high mobility applications, it is mandatory to design a nonlinear detection scheme to retrieve the transmitted signal from the distorted observations.

Attributed to the non-ideal power amplifier, the nonlinear distortions induce multiplicative distortions and intersymbol interference (ISI) in the OTFS system. It further causes the posterior probability of the transmitted signal non-Gaussian and analytically intractable. The present invention proposes an amalgamation of maximal ratio combining (MRC) and particle filter in the delay-Doppler domain to retrieve the desired signal from the nonlinearly impaired observations. Particle filter is well-known to deal with the non-Gaussian and nonlinear estimation. It approximates the target distribution by a set of randomly chosen particles and its associated weights. Bayesian inference is then applied on the particles and weights to obtain the desired estimate. A receive analog beamforming is employed to mitigate the huge path loss and established an input-output relation in the delay-Doppler domain with nonlinearity that aids in the nonlinear detector design.

System Model

FIG. 1 illustrates different communication scenarios between the base station 100 and mobile user inside a moving vehicle 110, and high-speed bullet train 120, and stationary mobile user 130 with one path coming through moving scatterer 140. Due to the multipath and user or scatterers' velocity, the received signal will experience frequency selective fading as well as Doppler shift. In the scenario of FIG. 1, let us suppose the transmitter is base station 100, and mobile user 110 is the receiver employed with a uniform linear antenna array with $N_r$ antenna elements. The information transmission is accomplished by using OTFS modulation scheme from the transmitter. The receiver receives the transmitted signal after traversing over the multipaths.

FIG. 2 shows the OTFS transmitter-receiver with nonlinear power amplifier. Let an OTFS frame $X \in \mathbb{C}^{M \times N}$ consisting complex data symbols is arranged in a two-dimensional M×N delay-Doppler grid. M and N denote the number of delay samples and Doppler samples, respectively. The OTFS frame is converted to time domain signal through OTFS modulator 200 and passed through the nonlinear power amplifier 210. The nonlinearly distorted OTFS sample $s\dagger(n)$ in $n^{th}$ time instant is represented as $$s\dagger(n) = G(|s(n)|)\exp(j\Phi_{s(n)} + j\Psi(|s(n)|)) \quad 1$$

Where s(n) is the time-domain OTFS sample at $n^{th}$ instant;

$$G(|s(n)|) = g|s(n)|/\left[1 + (g|s(n)|/V_{sat})^{2\sigma_p}\right]^{\frac{1}{2\sigma_p}}$$

is the amplitude distortion defined by amplitude modulation-amplitude modulation (AM/AM) and $\Psi(|s(n)|) = \kappa|s(n)|\tilde{q}_1/[1+(|s(n)|/\beta)\tilde{q}_2]$ is the additional phase distortion defined by amplitude modulation—phase modulation (AMIPM), according to modified Rapp model of mmWave power amplifier. $V_{sat}$ represents the saturation voltage of power amplifier; g and $\sigma_p$ are the linear gain and smoothness factor, respectively of power amplifier. Other parameters $\kappa$, $\beta$, $\tilde{q}_1$, and $\tilde{q}_2$ are power amplifier parameters; $\Phi_{s(n)}$ denotes the phase of s(n). The degree of distortion from the poweramplifier is defined by input back off (IBO) which is expressed as $$-10\log_{10}\left(\frac{p_i}{p_{sat}}\right),$$

where $p_i$ is input signal power to power amplifier and $p_{sat}$ is saturation power. Lower IBO constitutes a higher nonlinear distortion from the power amplifier. The distorted signal $s_f(n)$ propagates through the high mobility multipath fading channel 220. Finally, it is received at the receiver 230 and processed by the proposed nonlinear detector to estimate the delay-Doppler domain OTFS frame samples $\hat{X}$.

Proposed Nonlinear Detector Design

FIG. 3 shows the block diagram of the receiver with the proposed nonlinear detector where this disclosure has the contributions in the block 330-360. The received signal at receiving antennas 300 passes through the receive analog beamforming 310 that decouples the received signal into multiple parallel paths. The path identification 320 can be performed by thresholding the received signal after analog beamforming. Let $\theta_i$, where i=1, 2, . . . , B denote the beamforming angles corresponding to which a path exists i.e., received signal power after beamforming is greater than a threshold value. Further, let corresponding to an identified path with beamforming angle $\theta_i$, let the Doppler index is $k_{\theta_i}$, delay index is $l_{\theta_i}$, and complex gain of the channel is $\alpha_{\theta_i}$.

The received time-domain signal after beamforming for each identified path, $\tilde{r}_{\theta_i}$ is then converted in the delay-Doppler domain 330, where it is nonlinearly distorted. For the rectangular pulse shaping waveform, the input-output relation in the delay-Doppler domain with nonlinearity for an identified path corresponding to beamforming angle $\theta_i$ can be established as $$Y_{\theta_i}(l,k) = \quad 2$$

$$\begin{cases} \alpha_{\theta_i} e^{j\frac{2\pi}{MN}k_{\theta_i}(l-l_{\theta_i})} X^{\dagger}\left([l-l_{\theta_i}]_M, [k-k_{\theta_i}]_N\right) & l \in [l_{\theta_i}, M-1] \\ \frac{N-1}{N}\alpha_{\theta_i} e^{j\frac{2\pi}{MN}k_{\theta_i}(l-l_{\theta_i})} e^{-j\frac{2\pi}{N}[k-k_{\theta_i}]_N} X^{\dagger}\left([l-l_{\theta_i}]_M, [k-k_{\theta_i}]_N\right) & l \in [0, l_{\theta_i}) \end{cases}$$

Here, $X^{\dagger}(l, k)$ is the nonlinearly distorted OTFS sample in the delay-Doppler domain which can be expressed as $$X^{\dagger}(l,k) = \left[X(l,k)\frac{1}{N}\sum_{k=0}^{N-1}\tilde{p}_{s(l+\tilde{k}M)} + \xi_{s(l+\tilde{k}M)}(k)\right] \quad 3$$

Where X(l, k) is the OTFS sample in $l^{th}$ delay index and $k^{th}$ Doppler index, and $$\frac{1}{N}\sum_{k=0}^{N-1}\tilde{p}_{s(l+\tilde{k}M)}$$

represents the multiplicative distortion, where $$\tilde{p}_{s(l+\tilde{k}M)} = ge^{j(\Psi(|s(l+\tilde{k}M)|))}/\left[1+(g|s(l+\tilde{k}M)|/V_{sat})^{2\sigma_p}\right]^{\frac{1}{2\sigma_p}} \text{ and}$$

$$\xi_{s(l+\tilde{k}M)}(k) = \frac{1}{N}\sum_{k=0}^{N-1}\left(\tilde{p}_{s(l+\tilde{k}M)}\sum_{\tilde{p}=0,\tilde{p}\neq k}^{N-1}X(l,\tilde{p})e^{j2\pi(\tilde{p}-k)\tilde{k}/N}\right)$$

denotes the ISI from the nonlinear power amplifier. Note that, additive white Gaussian noise (AWGN) that is independent and identically distributed (i.i.d) complex random variable with zero mean and variance $\sigma_v^2$ is omitted in (2) for brevity.

Maximal Ratio Combining: Attributed to the nonlinear distortion of power amplifier, the linear relation between the transmitted OTFS samples X(l, k) and observations $Y_{\theta_i}(l, k)$ in the delay-Doppler domain is disorganized (see (2)) that prevents the direct application of maximal ratio combining (MRC) for the detection of the desired signal. However, considering the delay-Doppler domain nonlinearly distorted OTFS samples $\hat{X}^\dagger(l, k)$ as an auxiliary state, (2) represents a linear relationship between the observations $Y_{\theta_i}(l, k)$ and nonlinearly distorted samples $\hat{X}^\dagger(l, k)$. Hence, compensating for the delay shift, Doppler shift, and phase shift followed by MRC can yield the nonlinearly distorted delay-Doppler domain OTFS sample $\hat{X}^\dagger(l, k)$. The compensation phase can be performed as $$\hat{Y}_{\theta_i}(l, k) = \begin{cases} e^{-j\frac{2\pi}{MN}k_{\theta_i}([l+l_{\theta_i}]_M - l_{\theta_i})} Y_{\theta_i}([l+l_{\theta_i}]_M, [k+k_{\theta_i}]_N) & l \in [l_{\theta_i}, M-1] \\ \frac{N}{N-1} e^{-j\frac{2\pi}{MN}k_{\theta_i}l} e^{j\frac{2\pi}{N}k} Y_{\theta_i}([l+l_{\theta_i}]_M, [k+k_{\theta_i}]_N) & l \in [0, l_{\theta_i}) \end{cases} \quad 4$$

The application of MRC to estimate the delay-Doppler domain nonlinearly distorted OTFS samples can be performed as $$\hat{X}^\dagger(l, k) = \frac{\sum_{i=1}^{B} \alpha_{\theta_i}^* \hat{Y}_{\theta_i}(l, k)}{\sum_{i=1}^{B} |\alpha_{\theta_i}|^2} \quad 5$$

Now the aim is to retrieve the symbol of interest $X(l, k)$ from the estimated delay-Doppler domain nonlinearly distorted. OTFS samples $\hat{X}^\dagger(l, k)$.

Particle Filter: The particle filter is utilized to approximate any continuous intractable distribution in discrete form utilizing weights and particles. Due to the nonlinearity, the posterior distribution of delay-Doppler samples becomes analytically intractable and the closed form expression of MAP detection cannot be obtained. However, the discrete approximation simplifies the closed form solution. But, for this approximation, drawing the samples from the intractable distribution is not feasible. Hence, the samples are drawn from different distribution which is importance distribution. Optimal importance distribution is used to draw particles, and weights of the particles are calculated according to likelihood. Thus, particle filter helps in approximating the intractable posterior distribution of delay-Doppler samples in discrete form in terms of particles and weights, which allows us to obtain the solution of MAP detection to obtain the estimate of delay-Doppler transmitted samples.

The basic idea of the particle filter is to approximate the non-Gaussian continuous target distribution numerically by a set of randomly chosen samples (particles) $\{X^q(l, k)_{q=1}^Q\}$ with its associated weights $\{w^q(l, k)_{q=1}^Q\}$, where Q represents the total number of particles. Drawing samples from the intractable target distribution is infeasible, hence, the particles $X^q(l, k)$ are drawn from a different distribution known as the importance distribution or importance function i.e., $X^q(l, k) \sim \pi(X(l, 0:k)|\hat{X}^\dagger(l, 0:k))$, where $\pi(X(l, 0:k)|\hat{X}^\dagger(l, 0:k))$ represents the importance distribution. $X(l, 0:k)=X(l, 0), \ldots, X(l, k)$ are the desired transmit sequence in the $l^{th}$ delay index and from 0 to k Doppler index. The weighted particle presentation $(w^q(l, k), X^q(l, k))$ of the target posterior distribution $p(X(l, k)|\hat{X}^\dagger(l, 0:k))$ can be expressed as $$p(X(l, k)|\hat{X}^\dagger(l, 0:k)) \approx \sum_{q=1}^{Q} w^q(l, k)\delta(X(l, k) - X^q(l, k)) \quad 6$$

Where $\delta(X(l, k) - X^q(l, k))$ denotes the Dirac measure at the point $X^q(l, k)$. Prior and optimal importance functions are the two popular choices of importance distribution reported in the literature. The optimal importance distribution is $p(X(l, k)|X^q(l, 0:k-1), \hat{X}^\dagger(l, k))$, and the expression of the importance weights $w^q(l, k)$ corresponding to optimal importance density are defined as [M. S. Arulampalam, S. Maskell, N. Gordon and T. Clapp, "A tutorial on particle filters for online nonlinear/non-Gaussian Bayesian tracking," in IEEE Transactions on Signal Processing, vol. 50, no. 2, pp. 174-188, February 2002]

$$w^q(l, k) = w^q(l, k-1)p(\hat{X}^\dagger(l, k)|X^q(l, 0:k-1)) \quad 7$$

The multiplicative distortion $$\frac{1}{N}\sum_{\tilde{k}=0}^{N-1} [?]_{s(l+\tilde{k}M)}$$

in (3) can be approximated as $\tilde{\gamma}$. Now, for the underlying system, assuming $\tilde{\gamma}$ and $\xi_{s(l+\tilde{k}M)}(k)$ as deterministic and known, (3) represents a linear Gaussian model of the nonlinearly distorted delay-Doppler samples and the target delay-Doppler transmitted samples. The Gaussian model is attributed to the AWGN which is present in the system. The optimal importance density $\pi(X(l, k)|X^q(l, 0:k-1), \hat{X}^\dagger(l, k), \xi_{s(l+\tilde{k}M)}(k), \tilde{\gamma}) = p(X(l, k)|X^q(l, 0:k-1), \hat{X}^\dagger(l, k), \xi_{s(l+\tilde{k}M)}(k), \tilde{\gamma})$ hence follows the Gaussian distribution according to (3) with its mean and variance given as $$\mu_* = \tilde{\gamma}^{-1}\left(\hat{X}^\dagger(l, k) - \xi_{s(l+\tilde{k}M)}(k)\right), \sum_* = \frac{\sigma_v^2}{|\tilde{\gamma}|^2} \quad 8$$

The weights of the particles can be updated using (7). It is important to note that the evaluation of $p(\hat{X}^\dagger(l, k)|X^q(l, k-1), \xi_{s(l+\tilde{k}M)}(k), \tilde{\gamma})$ is difficult owing to the involved nonlinearity. However, for the considered system, $$p(\hat{X}^\dagger(l, k)|X^q(l, k-1), \xi_{s(l+\tilde{k}M)}(k), \tilde{\gamma}) = p(\hat{X}^\dagger(l, k)|X^q(l, k), \xi_{s(l+\tilde{k}M)}(k), \tilde{\gamma})p(X(l, k)|X^q(l, k-1)) \propto p(\hat{X}^\dagger(l, k)|X^q(l, k), \xi_{s(l+\tilde{k}M)}(k), \tilde{\gamma}) \text{ as } p(X(l, k)|X^q(l, k-1)) \propto p(X(l, k)),$$

where $p(X(l, k))$ is constant. Now the evaluation of the weights depends upon the likelihood function that follows Gaussian distribution according to (3), i.e., $p(\hat{X}^\dagger(l, k)|X^q(l, k), \xi_{s(l+\tilde{k}M)}(k), \tilde{\gamma}) \sim \mathcal{CN}(\mu^q(l, k), \Sigma^q(l, k))$, where mean $\mu^q(l, k)$ and variance $\Sigma^q(l, k)$ are defined as $$\mu^q(l, k) = \hat{\tilde{\gamma}}X^q(l, k) + \hat{\xi}_{s(l+\tilde{k}M)}(k), \Sigma^q(l, k) = \sigma_v^2$$

The estimation of ISI $\hat{\xi}_{s(l+\tilde{k}M)}(k)$ on which the mean of the likelihood depends can be carried by passing the estimated nonlinearly distorted samples $\{\hat{X}^l(l, k)\}_{k=0}^{N-1}$ through a hard detector to obtain the tentative decisions $\{\tilde{X}(l, k)\}_{k=0}^{N-1}$. The tentative decisions can then be converted to time domain samples $\hat{s}(n)$ and $\hat{\xi}_{s(l+\tilde{k}M)}(k)$ can be obtained from its expression. Further, the value of $\hat{\tilde{\gamma}}$ can be taken as the mean of $\{\hat{\gamma}_{s(l+\tilde{k}M)}(k)\}_{k=0}^{N-1}$ or can be determined heuristically. It is important to note that the mmWave power amplifier is mathematically modeled by the modified Rapp model with standard parameters. Thus, the values of $(g, \sigma_p, V_{sat}, \kappa, \beta, \tilde{q}_1, \tilde{q}_2)$ can be assumed to be known at the receiver. Also, the particles do not propagate for the considered system owing to the lack of state dynamics, hence, the importance sampling becomes an i.i.d sampling and the weights of the particles are required to reset to 1/Q at each step resulting in $w^q(l, k-1)=1/Q$. Finally, the associated unnormalized weights of the particles can be calculated utilizing the likelihood function $p(\hat{X}^\dagger(l, k)|X^q(l, k), \xi_{s(l+\tilde{k}M)}(k), \tilde{\gamma})$ and $w^q(l, k-1)=1/Q$ in (7) by $$w^q(l, k) \propto \frac{1}{\pi \det\{\sum^q(l, k)\}} \qquad (9)$$

$$\exp - \left[\left(\hat{X}^\dagger(l, k) - \mu^q(l, k)\right)^H \left(\sum^q(l, k)\right)^{-1} \left(\hat{X}^\dagger(l, k) - \mu^q(l, k)\right)\right] \qquad (10)$$

To realize a realistic distribution, the weights are normalized as $w^q(l, k) = w^q(l, k)/\Sigma_{q=1}^Q w^q(l, k)$.

Data Detection: Here the data detection is executed using the MAP decision rule which requires the expression of posterior distribution of the transmitted signal that becomes intractable due to nonlinearity. The particle filter approximates the intractable posterior distribution of the transmitted signal in terms of weights and particles. The MAP estimation chooses the particle with maximum weight. Then hard detection is applied on the chosen particle to map it on to the nearest modulation symbols in order to obtain the estimate of the required delay-Doppler symbols.

The drawn samples $X^q(l, k)$ with its corresponding importance weights $w^q(l, k)$ are utilized for obtaining the maximum a posterior (MAP) estimate as $$\hat{X}(l, k) = \arg\max_{X^q(l,k)} \sum_{q=1}^Q w^q(l, k)\delta(X(l, k) - X^q(l, k)) \qquad (10)$$

The calculation of estimated $\{\hat{\xi}_{s(l+\tilde{k}M)}(k)\}_{k=0}^{N-1}$ depends on the initial tentative decisions $\{\hat{X}(l, k)\}_{k=0}^{N-1}$ that may contain errors which will result in erroneous estimation of $\{\hat{\xi}_{s(l+\tilde{k}M)}(k)\}_{k=0}^{N-1}$. This will lead to the inaccurate evaluation of importance density for drawing particles, and weight calculation, which degrades the performance of the proposed algorithm. Hence, an iterative decision-aided approach is adopted to improve performance. In the iteration, the whole process of drawing particles, weight update, and MAP detection are repeated with the most updated $\{\hat{X}(l, k)\}_{k=0}^{N-1}$ to calculate $\{\hat{\xi}_{s(l+\tilde{k}M)}(k)\}_{k=0}^{N-1}$. The iteration stops when $\{\hat{X}(l, k)\}_{k=0}^{N-1}$ obtained at the current iteration no longer differs from $\{\hat{X}(l, k)\}_{k=0}^{N-1}$ obtained at the previous iteration or when the iteration reached its maximum number ($N_{iter}$). With each iteration, the number of errors in $\{\hat{X}(l, k)\}_{k=0}^{N-1}$ becomes relatively small which subsequently increases the estimation accuracy of $\{\hat{\xi}_{s(l+\tilde{k}M)}(k)\}_{k=0}^{N-1}$ and enhances the algorithm performance. The flow diagram of the proposed nonlinear detector which is a combination of MRC and iterative particle filter is shown in FIGS. 4A and 4B. The FIG. 4A shows a partial view of the flow diagram, while the FIG. 4B shows another and final partial view of the flow diagram.

Results: For testing, OTFS symbols N=128 and subcarriers M=128 is considered. The carrier frequency is centered at 28 GHz and subcarrier spacing is 200 kHz. The information symbol is modulated by QPSK modulation. For the channel model, the Urban Microcell (UMi) street canyon channel model is adopted, simulated according to the tapped delay line (TDL)-B model of 3GPP ["3GPP TR 38.900: Study on channel model for frequency spectrum above 6 GHz." Tech. Rep.] in the NLOS scenario with a delay spread of 66 ns. Further, the nonlinear power amplifier model proposed by IEEE 802.11ad TG [E. Perahia et al., "IEEE P802.11 Wireless LANs TGad Evaluation Methodology," IEEE, vol. 802, pp. 3-5, 2010] is considered to model the nonlinearity of mmWave power amplifier. The signal-to-noise ratio (SNR) of the information symbol is aerinea as $$SNR_d = \frac{E\{|X^\dagger|^2\}}{\sigma_v^2}.$$

The size of particles for data detection is set to Q=10 and the maximum iteration $N_{iter}$ is also set to 10. The channel is assumed to be known at the receiver.

The performance of the proposed detector for different degrees of nonlinear distortions over the mmWave NLOS UMi channel is evaluated in FIG. 5. The speed $v_s$=120 km/hr and $N_r$=128. It is observed that the proposed nonlinear detector addresses the nonlinearity efficiently and can provide reliable communication (BER=$10^{-5}$) at a low $SNR_d$ of 0 dB even at 0 dB IBO, i.e., when complete nonlinearity is induced. The attainment of reliable communication at a very low $SNR_d$ is attributed to the beamforming gain at the receiver. Further, it can also be observed that when the IBO increases to 6 dB and 12 dB, the proposed detector shows improved performance by 2 dB and 2.5 dB $SNR_d$ respectively, to attain BER=$10^{-4}$. This is owing to the fact that the degree of nonlinear distortion decreases with increasing IBOs, which eventually improves the detector performance. In FIG. 5, the performance of present nonlinear detector is compared with digital predistorter (DPD) [S. G. Neelam and P. R. Sahu, "Error performance of OTFS in the presence of IQI and PA Nonlinearity," in 2020 National Conference on Communications (NCC), 2020, pp. 1-6] at 0 dB IBO. A significant $SNR_d$ improvement of our detector compared to DPD can be observed. The figure depicts that DPD fails to deal with the severe nonlinearity at high frequency. The performance of the detector of [Y. Shan and F. Wang, "Low-Complexity and Low-Overhead Receiver for OTFS via Large-Scale Antenna Array," IEEE Transactions on Vehicular Technology, vol. 70, no. 6, pp. 5703-5718, 2021] with linear power amplifier is shown. The proposed detector achieves similar performance of linear power amplifier when degree of distortion is reduced i.e., at 6 dB and 12 dB IBO, for $SNR_d$ above −6 dB.This is attributed to the improvement in the initial estimates at higher $SNR_d$ and reduction in the nonlinearity at high IBOs.

FIG. 6 shows the BER versus $SNR_d$ of the proposed nonlinear detector for various speeds over the mmWaveUMi NLOS channel with nonlinear power amplifier at 0 dB IBO. The different speeds are taken as $v_s$=30 km/hr, 120 km/hr, and 500 km/hr which corresponds to a maximum Doppler frequency of 777.77 Hz, 3.11 kHz, and 12.96 kHz respectively. The number of receive antennas is $N_r$=128. It is observed from the figure that the proposed nonlinear detector is able to retrieve the transmitted samples for low as well as high speeds. It can also be observed that the performance of the proposed nonlinear detector is almost the same for the three different speeds which show the robustness of the OTFS modulation in high mobility scenarios.

The advantages of the present invention can be summarized as hereunder:
1. The presented invention considered a practical non-ideal power amplifier for mmWave systems in high mobility applications.
2. OTFS is employed to deal with the high mobility of channel, which is known to be resilient to the delay-Doppler shifts. Hence, the proposed framework is suitable for establishing communications link operating in mmWave frequency band under high mobility scenarios.
3. The nonlinear distortions from non-ideal power amplifier induce additional inter symbol interference in OTFS systems and cause the target distribution to be analytical intractable, which is handled in the presented invention.
4. Large antenna arrays are deployed at the receiver, which is used for analog beamforming to mitigate the huge path loss in mmWave.
5. With beamforming, the relation between input-output with nonlinearity is derived, which aids in developing low complex detector.
6. The proposed nonlinear detection methodology is spectrally more efficient compared to DPD that requires five times bandwidth of the transmitted signal, which is huge for mmWave systems employed to achieve high data rate. Hence, DPD is spectrally inefficient. In contrast, the present invention can handle the nonlinearity directly at the receiver, which do not require any additional bandwidth.
7. The invention is applicable in achieving reliable communication in high-speed applications employed with minWavelike inter and intra vehicular communications, high-speed railways, mmWaveIoT systems, UAV systems in mmWave, cellular communication in 5G, etc.

The invention claimed is:

1. A receiver with nonlinear detector for Orthogonal Time-Frequency Space (OTFS) based mmWave communication systems involving non-ideal power amplifier, said receiver with nonlinear detector is configured to retrieve signal having nonlinear distortions including multiplicative distortion and inter symbol interference (ISI) resulting in intractable posterior distribution of delay-Doppler samples attributed by said non-ideal power amplifier and comprises
antennas for receiving transmitted signal and passing the same to an analog beamforming unit;
said analog beamforming unit to decouple the received signal into multiple parallel paths;
at least one delay-Doppler domain unit for converting received time-domain signal after beamforming for each identified path into delay-Doppler domain with applicable nonlinear distortion;
maximal ratio combining (MRC) unit with delay and Doppler compensating unit to yield nonlinearly distorted delay-Doppler domain OTFS sample $\hat{X}^\dagger(l, k)$;
particle filter unit to approximate intractable distribution through particles and weights, which involves estimation of the ISI from passing the nonlinearly distorted delay-Doppler domain OTFS samples $\{\hat{X}^\dagger(l, k)\}_{k=0}^{N-1}$ through a hard detector to obtain tentative decisions $\{\hat{X}^\dagger(l, k)\}_{k=0}^{N-1}$ and converting the tentative decisions to time domain samples $\hat{s}(n)$, whereby the ISI $\hat{\xi}_{\hat{s}(l+\tilde{k}M)}(k)$ is obtained from its expression, thus enabling Maximum A-posteriori Probability (MAP) detection to acquire the transmitted delay-Doppler samples estimate free of the ISI effect.

2. The receiver with nonlinear detector as claimed in claim 1, wherein the particle filter unit and the MAP detection are executed iteratively until the tentative decision obtained at current iteration becomes equal to obtained at previous iteration or until the iteration reaches its maximum value.

3. The receiver with nonlinear detector as claimed in claim 2, wherein the particle filter and MAP detection is executed in iteration with the most updated $\{\hat{X}(l, k)\}_{k=0}^{N-1}$ to calculate ISI $\{\hat{\xi}_{\hat{s}(l+\tilde{k}M)}(k)\}_{k=0}^{N-1}$ and multiplicative distortion $\tilde{\gamma}$ is determined heuristically;
whereby, with each iteration, the number of errors in $\{\hat{X}(l, k)\}_{k=0}^{N-1}$ becomes relatively small which subsequently increases the estimation accuracy of $\{\hat{\xi}_{\hat{s}(l+\tilde{k}M)}(k)\}_{k=0}^{N-1}$, thus enhancing the accuracy of particle filter, thereby, enabling detection of the signal free of the ISI effect and distortions;
whereby, iteration stops when $\{\hat{X}(l, k)\}_{k=0}^{N-1}$ obtained at the current iteration no longer differs from $\{\hat{X}(l, k)\}_{k=0}^{N-1}$ obtained at the previous iteration or when the iteration reached its maximum number ($N_{iter}$).

4. The receiver with nonlinear detector as claimed in claim 1, wherein the maximal ratio combining unit includes Field Programmable Gate Array (FPGA) board based computing hardware with accumulator, memory blocks, Mod operation, Multiplier, and Coordinate rotation digital Computer for executing computation of $$\hat{Y}_{\theta_i}(l, k) =$$

$$\begin{cases} e^{-j\frac{2\pi}{MN}k_{\theta_i}\left([l+l_{\theta_i}]_M - l_{\theta_i}\right)} Y_{\theta_i}\left([l+l_{\theta_i}]_M, [k+k_{\theta_i}]_N\right) & l \in [l_{\theta_i}, M-1] \\ \frac{N}{N-1} e^{-j\frac{2\pi}{MN}k_{\theta_i}l} e^{j\frac{2\pi}{N}k} Y_{\theta_i}\left([l+l_{\theta_i}]_M, [k+k_{\theta_i}]_N\right) & l \in [0, l_{\theta_i}) \end{cases}$$ and $$\hat{X}^\dagger(l, k) = \frac{\sum_{i=1}^{B} \alpha_{\theta_i}^* \hat{Y}_{\theta_i}(l, k)}{\sum_{i=1}^{B} |\alpha_{\theta_i}|^2}.$$

5. The receiver with nonlinear detector as claimed in claim 1, wherein the particle filter includes Inverse Fast Fourier Transform (IFFT), vectorization operator, the hard detector, importance density for drawing particles, and importance weight computation implemented in hardware using any FPGA board based counters, memory blocks, IFFT, arithmetic logic units, comparators, and Coordinate rotation digital Computer.

6. The receiver with nonlinear detector as claimed in claim 1, wherein the analog beamforming unit decouple the received signals into multiple parallel paths and identify the appropriate paths by thresholding the received signals, wherein the beamforming angle corresponding to which a path exists, specifically, received signal power after beamforming, is greater than a threshold value.

7. The receiver with nonlinear detector as claimed in claim 1, wherein the nonlinearly distorted delay-Doppler domain OTFS sample $X^\dagger(l, k)$ is expressed as $$X^\dagger(l, k) = \left[X(l, k)\frac{1}{N}\sum_{k=0}^{N-1}\boxed{?}_{\hat{s}(l+\tilde{k}M)} + \xi_{\hat{s}(l+\tilde{k}M)}(k)\right]$$

where, $X(l, k)$ is the OTFS sample in $l^{th}$ delay index and $k^{th}$ Doppler index, and $$\frac{1}{N}\sum_{k=0}^{N-1} Y_{\hat{s}(l+\tilde{k}M)}$$

represents multiplicative distortion, where $$Y_{s(l+\check{k}M)} = g e^{j(\psi(|s(l+\check{k}M)|))} / \left[1 + \left(g|s(l+\check{k}M)|/V_{sat}\right)^{2\sigma_p}\right]^{\frac{1}{2\sigma_p}} \text{ and}$$

$$\xi_{s(l+\check{k}M)}(k) = \frac{1}{N} \sum_{\check{k}=0}^{N-1} \left(\xi_{s(l+\check{k}M)} \sum_{\check{p}=0, \check{p}\neq k}^{N-1} X(l,\check{p}) e^{j2\pi(\check{p}-k)\check{k}/N}\right)$$

denotes the ISI from the non-ideal power amplifier; whereby, the delay-Doppler domain nonlinearly distorted OTFS samples $\hat{X}^\dagger(l, k)$ in an auxiliary state represents a linear relationship between observations $Y_{\theta_i}(l, k)$ and the $\hat{X}^\dagger(l, k)$, thus enabling application of the maximal ratio combining unit on compensating the delay shift, Doppler shift, and phase shift to yield the nonlinearly distorted delay-Doppler domain OTFS sample, wherein the compensation phase can be performed by computing $$\hat{Y}_{\theta_i}(l, k) = \begin{cases} e^{-j\frac{2\pi}{MN} k_{\theta_i}\left([l+l_{\theta_i}]_M - l_{\theta_i}\right)} Y_{\theta_i}\left([l+l_{\theta_i}]_M, [k+k_{\theta_i}]_N\right) & l \in [l_{\theta_i}, M-1] \\ \frac{N}{N-1} e^{-j\frac{2\pi}{MN} k_{\theta_i} l} e^{j\frac{2\pi}{N} k} Y_{\theta_i}\left([l+l_{\theta_i}]_M, [k+k_{\theta_i}]_N\right) & l \in [0, l_{\theta_i}) \end{cases};$$

wherein, the application of MRC to estimate the delay-Doppler domain nonlinearly distorted OTFS samples is performed by computing $$\hat{X}^\dagger(l, k) = \frac{\sum_{i=1}^{B} \alpha_{\theta_i}^* \hat{Y}_{\theta_i}(l, k)}{\sum_{i=1}^{B} |\alpha_{\theta_i}|^2}.$$

8. The receiver with nonlinear detector as claimed in claim 1, wherein the estimate of multiplicative distortion and the ISI are obtained by utilizing initial tentative estimates of the delay-Doppler samples $\{\hat{X}(l, k)\}_{k=0}^{N-1}$ that are obtained by passing the estimated nonlinearly distorted delay-Doppler samples specifically, output of the MRC through hard detection;
whereby, hard detection maps the output of MRC on to the nearest modulation symbols.

9. The receiver with nonlinear detector as claimed in claim 1, wherein the particle filter approximates the intractable posterior distribution of transmitted delay-Doppler samples in terms of particles and weights as $p(X(l, k)|\hat{X}^\dagger(l, 0: k)) \cong \sum_{q=1}^{Q} w^q(l, k)\delta(X(l, k)-X^q(l, k))$;
whereby the particles are drawn from optimal importance distribution that is obtained by approximating the multiplicative distortion $$\frac{1}{N} \sum_{\check{k}=0}^{N-1} [?]_{s(l+\check{k}M)}$$

as $\tilde{\gamma}$ and assuming $\tilde{\gamma}$ and $\xi_{s(l+\check{k}M)}(k)$ as deterministic and known, thus enabling the optimal importance distribution $\pi(X(l, k)|X^q(l, 0: k-1), \hat{X}^\dagger(l, k), \xi_{s(l+\check{k}M)}(k), \hat{\gamma}) = p(X(l, k)|X^q(l, 0: k-1), \hat{X}^\dagger(l, k), \xi_{s(l+\check{k}M)}(k), \hat{\gamma})$ follows the Gaussian distribution with its mean and variance given as $$\mu_* = \hat{\gamma}^{-1}\left(\hat{X}^\dagger(l, k) - \xi_{s(l+\check{k}M)}(k)\right), \sum_* = \frac{\sigma_v^2}{|\hat{\gamma}|^2};$$

whereby, weights of the particles depends upon likelihood that follows Gaussian distribution, specifically, $p(\hat{X}^\dagger(l, k)|X^q(l, k), \xi_{s(l+\check{k}M)}(k), \hat{\gamma}) \sim CN(\mu^q(l, k), \Sigma^q(l, k))$ where mean $\mu^q(l, k)$ and variance $\Sigma^q(l, k)$ are defined as $\mu^q(l, k) = \hat{\gamma}X^q(l, k) + \hat{\xi}_s(l+\check{k}M)(k)$, $\Sigma^q(l, k) = \sigma_v^2$ and the weight are calculated as $$w^q(l, k) \propto \frac{1}{\pi\det\{\sum^q(l, k)\}}$$
$$\exp - \left[\left(\hat{X}^\dagger(l, k) - \mu^q(l, k)\right)^H \left(\sum^q(l, k)\right)^{-1} \left(\hat{X}^\dagger(l, k) - \mu^q(l, k)\right)\right].$$

10. The receiver with nonlinear detector as claimed in claim 1, wherein data detection is executed using the MAP decision rule on the approximated posterior distribution of the transmitted delay-Doppler sample by $$\hat{X}(l, k) = \arg\max_{X^q(l, k)} \sum_{q=1}^{Q} w^q(l, k)\delta(X(l, k) - X^q(l, k))$$

whereby, the MAP estimation chooses the particle with maximum weight followed by the application of hard detection on the chosen particle to map it on to the nearest modulation symbols in order to obtain the estimate of the required transmitted delay-Doppler samples.

11. A method for nonlinear detection for OTFS based mmWave communication system with non-ideal power amplifier to retrieve signal having nonlinear distortions including multiplicative distortion and inter symbol interference (ISI) resulting in intractable posterior distribution of delay-Doppler samples attributed by said non-ideal power amplifier involving the receiver with detector as claimed in claim 1, comprising
receiving transmitted signal by the antennas and passing the same to the analog beamforming unit;
decoupling the received signal into multiple parallel paths by the analog beamforming unit;
converting received time-domain signal after beamforming for each identified path into delay-Doppler domain with applicable nonlinear distortion by the delay-Doppler domain unit;
yielding nonlinearly distorted delay-Doppler domain OTFS sample $\hat{X}^\dagger(l, k)$ involving the maximal ratio combining unit;
estimating the multiplicative distortions $\tilde{\gamma}$ and ISI $\hat{\xi}_{\hat{s}(l+\check{k}M)}(k)$ from their expressions by obtaining tentative decisions $\{\hat{X}(l, k)\}_{k=0}^{N-1}$ from estimating the nonlinearly distorted samples $\{\hat{X}^\dagger(l, k)\}_{k=0}^{N-1}$ through hard detection and converting the tentative decisions to time domain samples $\hat{s}(n)$;
utilizing estimated multiplicative distortions $\tilde{\gamma}$ and ISI $\hat{\xi}\hat{s}(l=\check{k}M)(k)$ to obtain the weights and particles from their expression and approximating continuous intractable distribution of transmitted delay-Doppler samples in discrete form utilizing particles and weights by particle filter unit to enable the MAP detection and signal free of the ISI and distortions effect;

executing the particle filter unit with MAP detection in iteration wherein the iteration stops when the tentative decisions $\{\hat{X}(l, k)\}_{k=0}^{N-1}$ obtained at the current iteration becomes equal to the estimates obtained at the previous iteration or until the iteration reaches its maximum value.

\* \* \* \* \*